United States Patent [19]

Hoch

[11] Patent Number: 4,893,948

[45] Date of Patent: Jan. 16, 1990

[54] DEVICE FOR BEARING MOUNTING MECHANISM

[75] Inventor: Paul-Gerhard Hoch, Schweinfurt, Fed. Rep. of Germany

[73] Assignee: SKF GmbH, Schweinfurt, Fed. Rep. of Germany

[21] Appl. No.: 231,882

[22] Filed: Aug. 12, 1988

[30] Foreign Application Priority Data

Aug. 14, 1987 [DE] Fed. Rep. of Germany ....... 3727150

[51] Int. Cl.⁴ .............................................. F16C 19/28
[52] U.S. Cl. .................................... 384/551; 384/538; 384/560; 384/585
[58] Field of Search ............... 384/538, 540, 559, 562, 384/560, 510, 585, 551

[56] References Cited

U.S. PATENT DOCUMENTS

| | | | |
|---|---|---|---|
| 1,811,679 | 6/1931 | Volet | 384/538 |
| 1,894,414 | 1/1933 | Olson | 384/538 |
| 4,732,497 | 3/1988 | Sawa et al. | 384/540 |

Primary Examiner—Lenard A. Footland
Attorney, Agent, or Firm—Eugene E. Renz, Jr.

[57] ABSTRACT

A device for mounting a bearing having an inner ring with a conical bore on a bearing seat having a conical clamping sleeve which, on the side of its large diameter, projects axially beyond the inner ring, comprising a spacer (12) positionable loosely on the end surface (13) of the inner ring (1) on the side of the clamping sleeve projection (A), the thickness of the spacer being less than that of the projection (A) in the preassembled state by an amount equal to the stroke (B) required to press in the clamping sleeve (9), the spacer thus limiting the distance (B) of the inward stroke.

5 Claims, 1 Drawing Sheet

DEVICE FOR BEARING MOUNTING MECHANISM

FIELD OF THE INVENTION

The present invention relates to bearing mounting mechanisms and more particularly to improvements in mechanisms utilizing a clamping sleeve.

BACKGROUND OF THE INVENTION

Mounting mechanisms utilizing clamping sleeves are not new per se. A mounting mechanism of this general type is shown in West German Auslegeschrift No. 1,096,299 where a self-aligning roller bearing with an inner ring having a conical bore is mounted on an axle journal by means of a clamping sleeve having a complementary conical lateral surface. The axle journal has a threaded section to receive a threaded ring which can be turned against the large end surface of the clamping sleeve. By this arrangement during assembly of the bearing, the clamping sleeve is first pressed with only a small or slight pressure into the bore of the inner ring whereby it is possible to displace the bearing on the axle journal slightly until it comes to rest against a collar. The clamping sleeve is then driven in by tightening the threaded ring in the ring gap to thereby rigidly mount the inner ring on the axle journal. A portion of the clamping sleeve projecting axially beyond the inner ring is provided with an external screw thread to receive an extractor nut for disassembly purposes.

In the case of precision bearings, it has been found that it is necessary during the mounting procedure to apply a predetermined radial tensioning force of the inner ring of the bearing to obtain optimum bearing play between the rolling elements and the bearing rings or in certain special instances to obtain a radial pretension as well. It has been found that when utilizing the prior known mechanisms described above, it is not possible to achieve the desired radial tensioning force since the conical clamping sleeve is not driven into the ring gap by the ring nut in a controlled manner. Thus it has been found that frequently bearing damage results especially when inexperienced mechanics install a bearing purchased as a ready to mount bearing in a machine and lacks the necessary technical knowledge and experience with bearings.

West German Patent No. 597,408 shows another prior known device designed to provide a remedy by utilizing a set of scale-like markings on the clamping sleeve. Thus when the ring nut is tightened, the scale is gradually covered as the clamping sleeve gradually moves into the bearing ring. Thus the mechanic is able to monitor the extent to which the sleeve is being pressed in. Providing an accurate scale on the clamping sleeve, obviously increases production costs considerably. Furthermore visual monitoring is very imprecise because of the scale divisions but also highly dependent on the concentration of the mechanic. Furthermore in many installation situations the graduations are obscured and it would be impossible to monitor the process visually.

SUMMARY OF THE INVENTION

With the foregoing in mind, it is therefore an object of the present invention to provide a mounting mechanism for bearings which overcomes the difficulties and drawbacks of the prior mechanisms described above and is characterized by novel features of construction and arrangement which facilitates accurate measurement of the tensioning force applied when a clamping sleeve is used to mount a bearing in a simple and reliable manner. To this end, in accordance with the present invention, a spacer is placed loosely on the end surface of the inner ring on the side of the clamping sleeve which projects beyond the inner ring of the bearing wherein the thickness of the spacer is less than the axial distance of the projection in the preassembled state by an amount equal to the stroke required to press the clamping sleeve in place. The spacer in this manner limits that distance of the inward stroke.

The present invention has many advantages over the prior art. For example, a predetermined defined radial tensioning force prescribable by the manufacturer of the bearing is produced when the bearing is mounted on the bearing seat in accordance with the mechanism and procedure of the present invention without the need for the mechanic to have any special knowledge or ability. For example, it is only necessary for the mechanic to push the assembly consisting of the bearing and the clamping sleeve onto the bearing seat of the axle or shaft and to press the clamping sleeve in until its end surface is flush with the spacer ring. The assembly may be supplied in the form indicated by the manufacturer as a preassembled unit. In this manner, it is thus impossible not to achieve the desired bearing properties or for premature bearing damage to occur as a result of incorrectly adjusted bearing play or incorrect pretension.

The configuration or shape of the spacer can be adapted to the specific application in question. It is advantageous, however, to provide a spacer ring which is especially easy to produce and which can be used anywhere.

In accordance with the preferred embodiment, the spacer rings are designed for each type of bearing and are made of thickness which takes into account the tolerances of a given bearing. In this manner deviations from the nominal dimensions of the bearing parts, clamping sleeve and even the bearing seat on the axle or shaft can be eliminated.

In accordance with another feature of the present invention, a locking member may be provided to secure the axial position of the clamping sleeve which locking member rests against the large end surface of the clamping sleeve and against the end surface of the spacer. The locking member ensures error-free assembly and simplifies assembly greatly. The locking member can, for example, comprise a tensioning nut which is screwed onto a threaded portion of the axle or shaft. A locking cover, a suitable sealing element or other type of machine component mounted in front such as a gear can be likewise utilized as the component or member.

BRIEF DESCRIPTION OF THE DRAWINGS

These and other objects of the present invention and the various features and details of the operation and constructions thereof are hereinafter more fully set forth with reference to the accompanying drawings, where.

DETAILED DESCRIPTION OF THE PREFERRED EMBODIMENT

Figure 1:
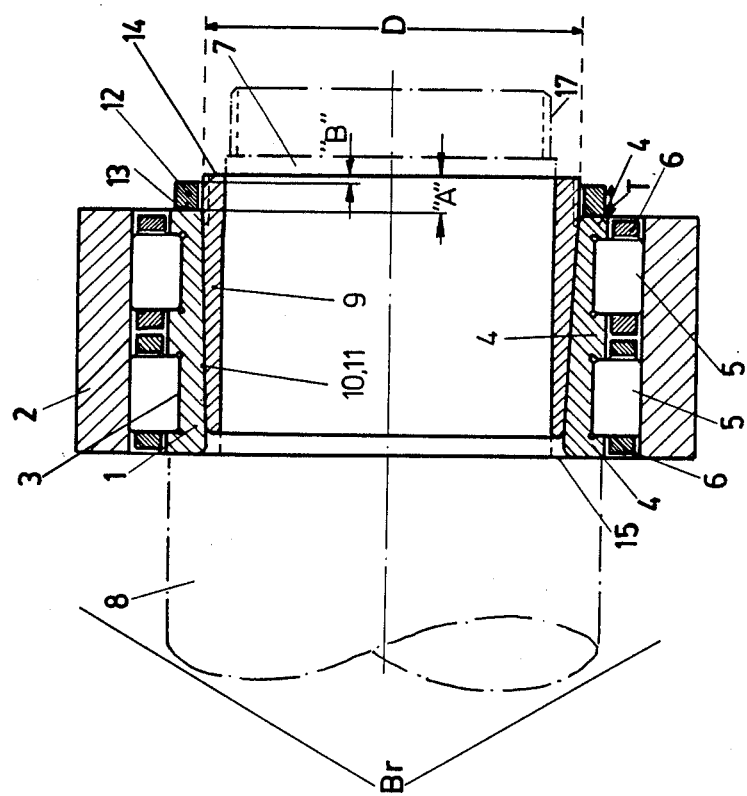
FIG. 1 is a transverse sectional view of a mounting mechanism in accordance with the present invention in the preassembled state.

Referring now to the drawings and particularly to FIG. 1 thereof, there is shown a cylindrical roller bearing generally designated by the reference letter $B_r$ comprising an inner ring 1, an outer ring 2 and in the present instance two rows of cylindrical rollers 5 and a plurality of cylindrical rollers 5 arranged in side by side rows and held a predetermined distance apart from one another by cages 6. The contact surface of the inner ring 1 on which the rollers 5 are guided is provided with a plurality of flanged portions 4, thereby defining a lateral surface 3 forming a raceway for the rollers 5.

The bearing $B_r$ is adapted to be mounted on a bearing seat of an axle or a shaft, in the present instance on a step journal 7 of a shaft 8 by means of a clamping sleeve 9. The clamping sleeve has a conical lateral surface 10 and is adapted to be pressed with a slight degree of force into the correspondingly conical bore 11 of inner ring 1. In the premounted state illustrated in FIG. 1, the side of a large diameter D projects beyond the end surface of the inner ring 1 by a distance A which is larger by a predetermined distance B than the thickness T of a spacer ring 12 which is placed loosely in front of the end surface 13 of the inner ring. The elements preassembled in this manner are pushed onto the stepped journal 7 until the inner ring 1 rests against a shoulder 15.

Figure 2:
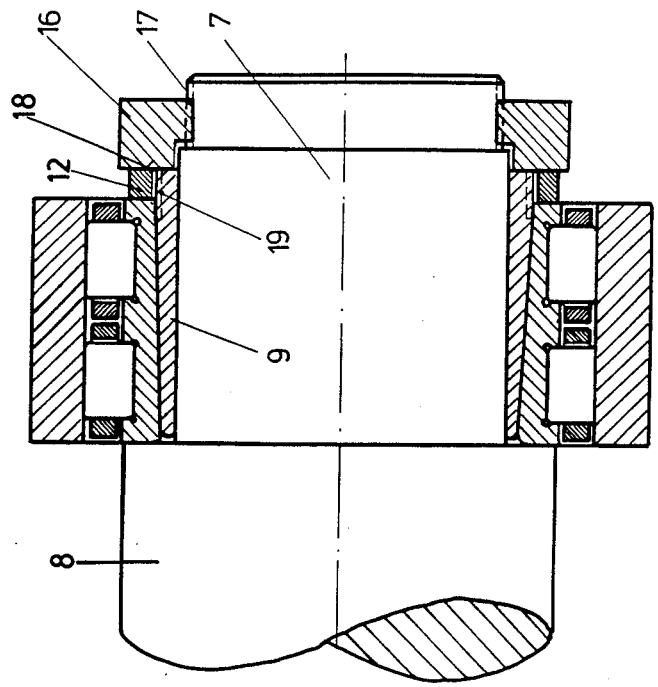
FIG. 2 is a view similar to FIG. 1 in the final assembled state.

Referring now to FIG. 2, the bearing is shown in its mounted position on the shaft 8. After the bearing has been positioned on shaft 8, a tensioning nut 16 having threads 17, is screwed onto the end of journal 7, and tightened until clamping sleeve 9 has been pressed into the ring-shaped gap between inner ring 1 and journal 7 by the stroke designated B in FIG. 1. Thus, the tensioning nut 16 serves as the component which secures the bearing in the axial direction. Contact surface 18 of tensioning nut 16 now rests against both spacer ring 12 and end surface 14 of clamping sleeve 9. The installation mechanism is therefore required merely to screw on and tighten tensioning nut 16, whereby the radial tensioning force prescribed by the manufacturer can be provided without any further action by the mechanic.

A number of bearing parameters can be determined in advance by the manufacturer and evaluated so that a spacer ring 12 of appropriately adjusted thickness can be selected. For example, the precise spacer ring 12 can be determined for bearing arrangements where an especially precise degree of pretension is required by means of a radial tensioning force applied to inner ring 1 or if an especially precise degree of play is required. The spacer 12 can compensate for the unavoidable deviations from the nominal dimensions of the individual bearing components, that is, of bearing rings 1, 2 and of rolling elements 5, but even of the associated clamping sleeve 9. Because the magnitude of the radial tensioning force depends on the magnitude of the inward pressing stroke B, the required radial tensioning force can be guaranteed within narrow limits in virtual independence of the tolerances, the only factor of any influence is the precision of the bearing seat.

Lateral surface 10 of clamping sleeve 9 is also provided, on the side of the large diameter, with a thread 19, onto which, after tensioning nut 16 and spacer ring 12 have been removed, an extractor nut can be screwed in the known manner. The axial space required for spacer ring 12 is therefor used for extraction thread 19, so that the bearing unit overall is no longer than known bearing units of the state of the art.

I claim:

1. Device for mounting a bearing including an inner ring with a conical bore on a bearing seat, said device comprising a conical clamping sleeve having a larger diameter end projecting an axial distance (A) beyond the inner ring, and means for mounting the bearing to provide a different degree of pretension by a single clamping sleeve using spacers of different thicknesses, said spacer (12) loosely and non-threadedly mounted on the outer conical surface of the clamping sleeve, the thickness of said spacer being less than that of the axial projection (A) in the preassembled state by an amount equal to the stroke (B) required to press in the clamping sleeve (9), the spacer thus limiting the distance (B) of the inward stroke to achieve a predetermined radial tension and a nut member (16) for axially displacing the spacer and sleeve relative to one another said distance (B).

2. Device according to claim 1, wherein said spacer (12) has a predetermined thickness which takes into account the deviations from nominal dimensions of at least the inner ring (1) and the clamping sleeve (9) is assigned to each individual bearing.

3. Device according to claim 1, wherein the spacer (12) is designed as a spacer ring.

4. Device according to claim 1, wherein the projecting part of the clamping sleeve (9) is provided with an external thread (19) so that an extractor nut can be screwed on after the spacer (12) has been removed.

5. Device according to claim 1, including a component (16) which can be mounted in contact with the large end surface (14) of the clamping sleeve (9) and which secures the sleeve's axial position, said component having a surface (18) which rests against the end surface of the spacer (12).

* * * * *